(12) United States Patent
Webster et al.

(10) Patent No.: US 8,844,975 B2
(45) Date of Patent: Sep. 30, 2014

(54) HOSE INTERVENTION CLAMP AND CLAMP SYSTEM FOR FIELD REPAIR

(75) Inventors: Paul Webster, Sugar Land, TX (US); Daniel A. Waina, Mentor, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 363 days.

(21) Appl. No.: 13/093,905

(22) Filed: Apr. 26, 2011

(65) Prior Publication Data

US 2011/0304136 A1 Dec. 15, 2011

Related U.S. Application Data

(60) Provisional application No. 61/353,804, filed on Jun. 11, 2010.

(51) Int. Cl.
*F16L 33/00* (2006.01)

(52) U.S. Cl.
USPC .......................................... 285/253; 285/252

(58) Field of Classification Search
USPC ........... 285/242, 245, 252, 253, 38, 420, 419, 285/920
See application file for complete search history.

(56) References Cited

U.S. PATENT DOCUMENTS

| | | | |
|---|---|---|---|
| 466,255 A * | 12/1891 | Paul | 279/7 |
| 576,119 A * | 2/1897 | Hess | 285/253 |
| 654,040 A * | 7/1900 | Wilkins | 285/253 |
| 1,039,096 A | 9/1912 | Christenson | |
| 1,997,152 A | 4/1935 | Penick et al. | |
| 3,297,343 A | 1/1967 | Oetiker | |
| 3,670,374 A * | 6/1972 | Hayes, Jr. | 29/281.1 |
| 5,380,052 A | 1/1995 | Hendrickson | |
| 5,653,481 A | 8/1997 | Alderman | |
| 6,023,027 A | 2/2000 | Neff | |
| 7,364,205 B2 * | 4/2008 | Weinhold | 285/252 |
| 2010/0230949 A1 | 9/2010 | Lake | |

* cited by examiner

*Primary Examiner* — Aaron Dunwoody

(74) *Attorney, Agent, or Firm* — Renner, Otto, Boisselle & Sklar, LLP

(57) ABSTRACT

A hose intervention clamp is provided for clamping a hose/connection nipple assembly, wherein the hose/connection nipple assembly has a hose and a connection nipple having a locking slot. The hose intervention clamp includes a locking ring, an upper clamp portion, and a lower clamp portion pivotally connected to the upper clamp portion. The upper and lower clamp portions are pivotally moveable relative to each other from a first at least partially open position to a second locking position, and in the second locking position the upper and lower clamp portions define a recess for receiving the hose/nipple assembly. The locking ring is configured to be received in the locking slot when the upper and lower clamp portions are in the second locking position. A hose intervention clamp system includes a hose/connection nipple assembly having a hose and a connection nipple having a locking slot, and the described clamp.

15 Claims, 8 Drawing Sheets

HOSE INTERVENTION CLAMP AND CLAMP SYSTEM FOR FIELD REPAIR

RELATED APPLICATION

This application claims the benefit of U.S. Provisional Patent Application Ser. No. 61/353,804 filed Jun. 11, 2010, which is hereby incorporated herein by reference.

FIELD OF THE INVENTION

The present invention is directed to a hose intervention clamp and a hose intervention clamp system for performing field repairs to hydraulic systems, and particularly a clamp for a hose intervention claim system including a clamp locking ring for clamping a hose and a hose connection nipple.

BACKGROUND OF THE INVENTION

Systems for conveying pressurized fluids, also known as hydraulic systems, have many applications. Generally, hydraulic systems utilize the flow of pressurized fluids for the generation, control, and transmission of forces. For example, hydraulic systems typically are employed to operate the blow-out preventers required to be present on undersea oceanic deep water oil and gas drilling wells. The blow-out preventers forcibly close off a well in the event of a well failure to prevent substantial leakage into the ocean. Should the hydraulic systems fail under such circumstances, substantial environmental damage may occur.

To successfully employ a hydraulic system, a hydraulics circuit must be maintained for the continuous flow of the hydraulic fluid through the system. Typically, hydraulic systems apply force or torque multiplication either by altering the effective areas in two connected cylinders or the effective displacement between a pump and a motor. For the hydraulic fluid to do work, it must be pumped so as to flow from a fluid source to the cylinders or motor, and then return to a fluid reservoir. A disruption or rupture to the fluid pathway in a hydraulic circuit will cause the hydraulic system to fail.

Hydraulic fluid commonly is conveyed through hoses made of rubber-like polymer materials. For example, conventional hoses may be made of a resilient polymeric material formed or extruded over a wire-like or similar metal mesh. The mesh, therefore, is an internal structure in the surrounding resilient material to provide strengthening of the hose material. This provides a balance between a desire for some resiliency to aid in hose manipulation, while having sufficient stiffness to reduce a likelihood of rupture. Such materials thus are rigid enough to maintain the flow of the pressurized fluid without rupturing, but also have a sufficient resiliency for some bending when positioning the hose.

The hose may be joined at one end to a fluid source with a connection nipple. The connection nipple typically is a rigid component. Depending on the application, a connection nipple may be made of a non-corrosive metal, such as stainless steel, or a rigid plastic material. The connection nipple may have a gradually tapered first end that may be inserted into the hose. An opposite second end of the connection nipple may be threaded or otherwise formed with a connector for connection to a hydraulic fluid source. In this manner, the hose may be connected to a hydraulic fluid source. In the area of the joint formed by the hose section and the connection nipple, a clamp typically is provided to secure the hose to the connection nipple, and thereby the fluid source.

Such a clamping system may be employed to repair a ruptured hydraulic circuit so as to reconnect a damaged hose section to the hydraulic fluid source. For example, in the event of a rupture to the hydraulic circuit, the hydraulic circuit may be repaired by severing a damaged hose section from a remaining intact hose section. The remaining intact hose section may then be reconnected to the fluid source using the connection nipple and clamp as described above.

In addition, the longer a conveying hose is, the greater the tendency to have a rupture. The hose, therefore, may be provided in hose sections that are joined using a rigid connection nipple that may be tapered on both sides, and therefore insertable into a hose section at both first and second ends. In the area of a joint between two adjacent hose sections, a clamp also is provided to secure the hose sections. Similarly, in the event of damage to a hose section, the hydraulic circuit may be repaired by severing the damaged hose section from a remaining intact hose section. A new hose section may then be joined to the remaining hose section with a connection nipple and clamp.

It will be appreciated that a joint at the connection between the hose and a hydraulic fluid source, or between two adjacent hose sections, may particularly provide a location for potential failure of the hydraulic circuit. The flow of pressurized fluid tends to exert forces against the hose in both the axial and radial directions. The clamp, therefore, must be able to secure the hose section in the axial direction to prevent the hose from pulling away from the connection nipple. In addition, the clamp must be able to maintain a sufficient compressive radial load against the radial force of the flowing pressurized fluid to seal the hose against the connection nipple, which maintains the hose connection and prevents leakage of the hydraulic fluid.

In harsh environments, such as the oceanic deep water applications referenced above, it becomes even more difficult to properly create and maintain a hydraulic circuit. The joints typically must be made utilizing a robotic remotely operated vehicle (ROV) because the environment is unsuitable for on-site human operation. In such an environment, or any environment that similarly may be associated with extreme temperatures, pressures, or other harsh conditions, clamps have repeatedly failed due to inadequate securing and ejection of the hose from the connection nipple.

SUMMARY OF THE INVENTION

The present invention provides an improved hose intervention clamp, or more simply referred to herein as a clamp, for use in a hose intervention clamp system. The clamp includes a locking mechanism for securing a hose and connection nipple with a reduced tendency for hose ejection from the connection nipple. The clamp also may be readily manipulated using a robotic ROV to properly position and secure the clamp about the hose/connection nipple assembly in harsh environmental conditions, including during use in oceanic deep water applications.

In accordance with such features, an aspect of the invention is a hose intervention clamp for clamping a hose/connection nipple assembly, wherein the hose/connection nipple assembly has a hose and a connection nipple having a locking slot. The hose intervention clamp includes a locking ring, an upper clamp portion, and a lower clamp portion pivotally connected to the upper clamp portion. The upper and lower clamp portions are pivotally moveable relative to each other from a first at least partially open position to a second locking position, and in the second locking position the upper and lower clamp portions define a recess for receiving the hose/connection nipple assembly. The locking ring is configured to be received in the locking slot when the upper and lower clamp portions are in the second locking position.

Another aspect of the invention is a hose intervention clamp system including a hose/connection nipple assembly having a hose and a connection nipple having a locking slot, and the described clamp.

Another aspect of the invention is a method of performing a hose intervention repair in a hydraulic system. The method includes the steps providing a hose, providing a connection nipple having a first end and a locking slot, forming a hose/connection nipple assembly by inserting the first end of the connection nipple into the hose, providing a clamp having a locking ring and a locking mechanism, positioning the clamp relative to the hose/connection nipple assembly such that the locking ring is positioned in the locking slot, and locking the clamp by operating the locking mechanism to lock the clamp over the hose/connection nipple assembly. The connection nipple may have a second end that is connected to a hydraulic fluid source.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

DETAILED DESCRIPTION

Figure 1:
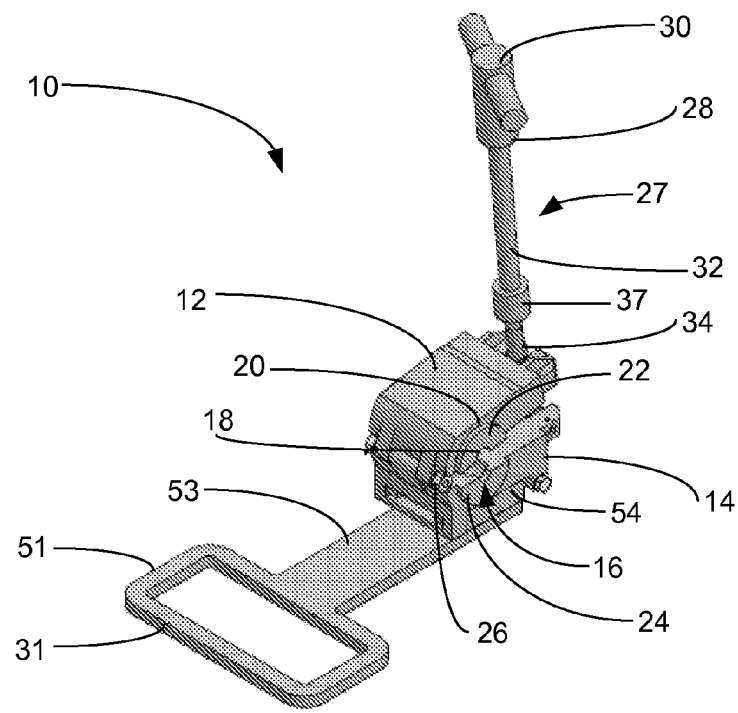
FIG. 1 is a three-dimensional perspective view depicting an exemplary hose intervention clamp for a hose intervention clamp system in accordance with embodiments of the present invention.

Embodiments of the present invention will now be described with reference to the drawings, wherein like reference numerals are used to refer to like elements throughout. It will be understood that the figures are not necessarily to scale.

Figure 2:
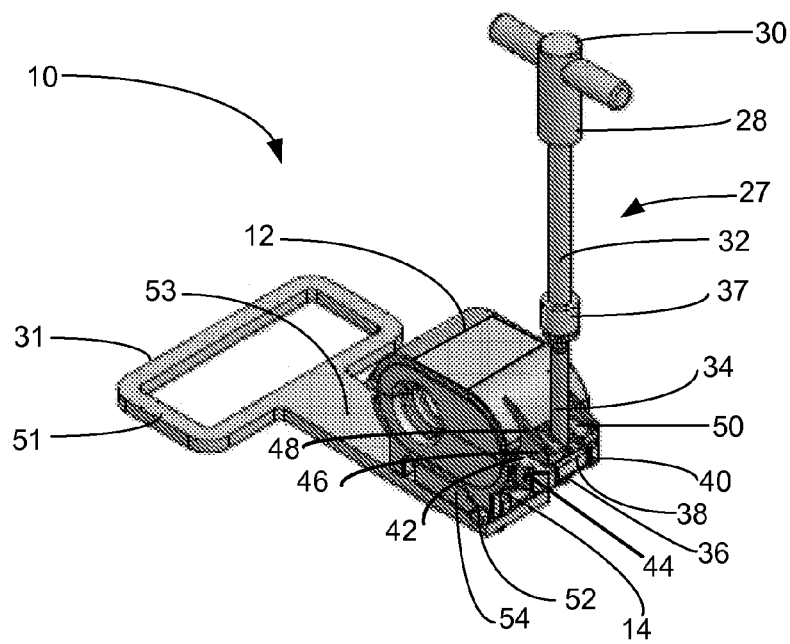
FIG. 2 is a three-dimensional perspective view depicting an exemplary hose intervention clamp for a hose intervention clamp system in accordance with embodiments of the present invention, viewed from the opposite side as compared to FIG. 1.
Figure 3:
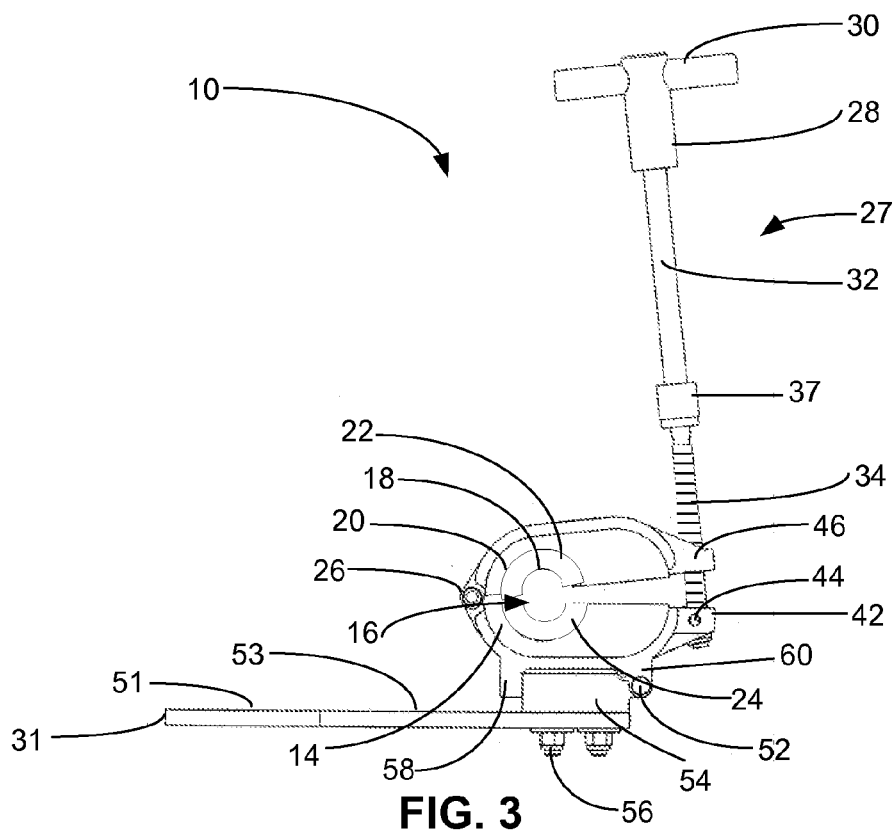
FIG. 3 is a schematic diagram depicting a side view of an exemplary intervention clamp for a hose intervention clamp system in accordance with embodiments of the present invention, wherein the clamp is in a first partially open position.
Figure 4:
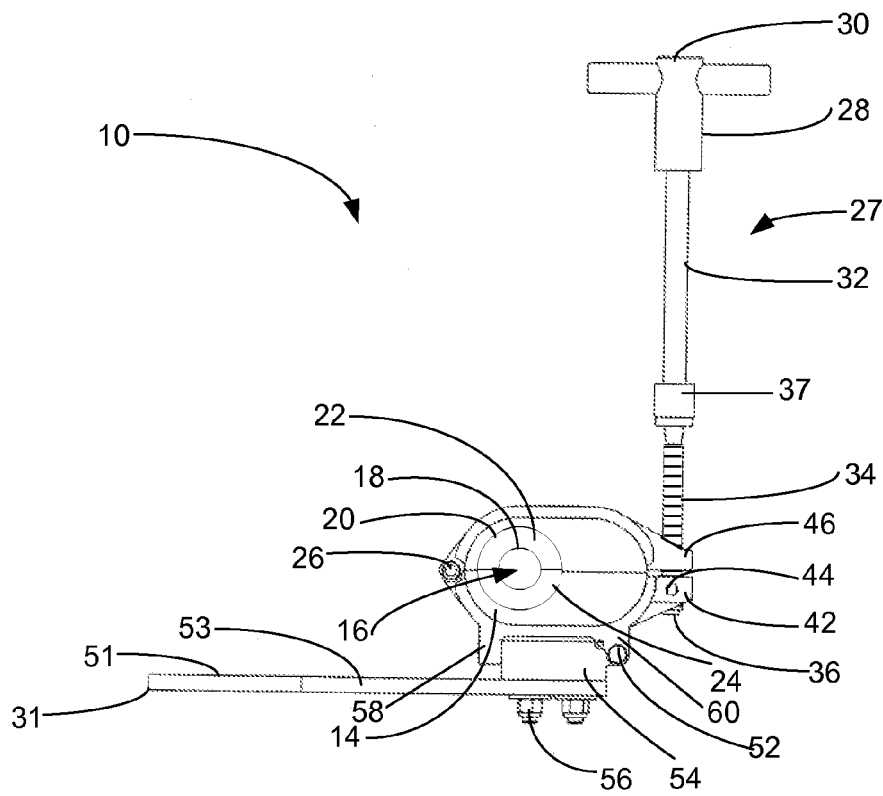
FIG. 4 is a schematic diagram depicting the side view of FIG. 2, wherein the clamp is in a second locking position.
Figure 5:
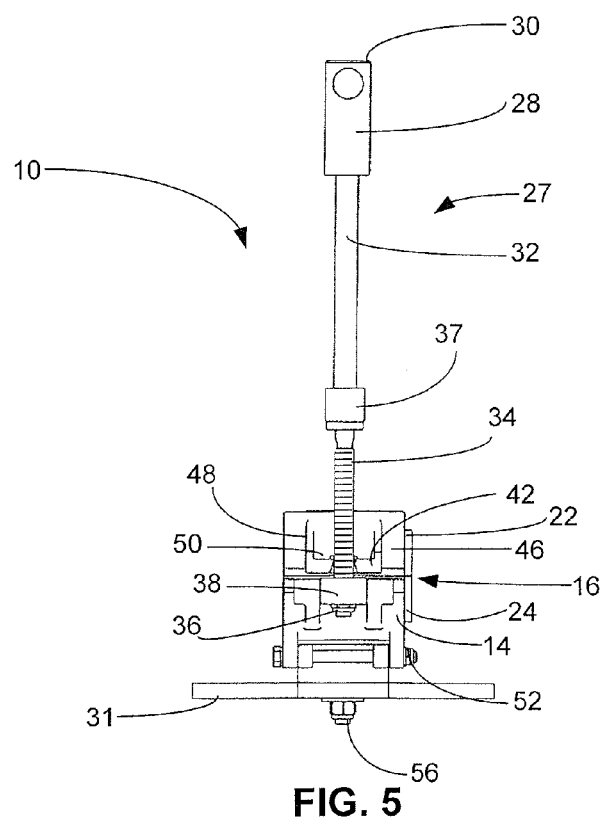
FIG. 5 is a schematic diagram depicting a front view of the exemplary hose intervention clamp of FIG. 4.

FIG. 1 is a three-dimensional perspective view depicting an exemplary hose intervention clamp 10 for a hose intervention clamp system. FIG. 2 is a three-dimensional perspective view depicting the exemplary hose intervention clamp of FIG. 1, viewed from the opposite side as compared to FIG. 1. As further explained below, FIG. 1 in particular depicts the clamp viewed toward the side containing a locking ring 16. FIGS. 3-5 are schematic diagrams depicting various views of the exemplary hose intervention clamp 10 of FIGS. 1 and 2, including a side view (FIGS. 3 and 4) and front view (FIG. 5).

Referring to FIGS. 1-5, the hose intervention clamp 10 includes an upper clamp portion 12, a lower clamp portion 14, and a locking ring 16. The locking ring 16 is a circular ring including an inner radial surface 18 and a concentric outer radial surface 20. The ring also is divided into two semi-circular ring portions including an upper locking ring portion 22 attached to the upper clamp portion 12, and a lower locking ring portion 24 attached to the lower clamp portion 14. As further explained below, the locking ring 16 is driven by a locking mechanism to secure a clamped hose/connection nipple assembly in place when the clamp is in a locking position.

The upper clamp portion 12 and lower clamp portion 14 are pivotally connected to each other by a clamp hinge 26. For example, looking at the side views, FIG. 3 depicts the clamp 10 in a first partially open position. Comparing FIG. 3 to FIG. 4, FIG. 4 depicts the clamp 10 in a second closed or substantially closed locking position. In such locking position, the upper locking ring portion 22 and the lower locking ring portion 24 essentially come together to form the complete locking ring 16. In the first partially open position, the upper clamp portion has been pivoted about the clamp hinge away from the lower clamp portion, such that the upper and lower ring portions have been separated. In this partially open position, a hose/connection nipple assembly may be inserted into the clamp, as further explained below.

The clamp 10 further includes a locking mechanism 27 for locking the clamp 10 over a hose/connection nipple assembly. The locking mechanism may include a torque tool 28 for moving the clamp portions from the first partially open position to the second locking position. As can be particularly seen in FIGS. 2 and 5 (and the other figures to some extent), the torque tool 28 may include a first gripping portion 30, a shaft 32 having a lower threaded section 34, a locking nut 36, a locking collar 37, and a swivel nut 38. To cooperate with the torque tool 28, the lower clamp portion 14 may include a lower receiving section 40 including two lower arms 42. The lower arms 42 define a recess for receiving the swivel nut 38 of the torque tool 28. Both the swivel nut and lower arms may have bores for receiving a pin 44 that extends through the swivel nut and the lower arms. In this manner, the torque tool 28 is pivotally connected to the lower clamp portion such that the torque tool may be pivoted or swiveled via the swivel nut relative to the lower clamp portion.

The upper clamp portion 12 may include two upper arms 46 that define a slot for receiving the shaft 32 of the torque tool 28. In addition, ridges 48 may sit on top of the upper arms to form a locking seat 50. The torque tool 28 may be operated as follows to close and lock the clamp. The first gripping portion 30 of the torque tool 28 may be provided in form of a turnable T-bar. When the T-bar is turned, the threaded portion 34 of the shaft 32 cooperates with opposite threads of the locking nut 36. This acts to drive the shaft downward with the locking nut being forced upward against the swivel nut 38 and/or lower arms 42. As the torque tool is driven downward, the locking collar 37 comes into contact with the locking seat 50. Further turning of the T-bar continues to drive the locking collar 37 downward, thereby closing the clamp until the second locking position is achieved in which the uppers arms 46 are held pressed against the lower arms 42 between the locking collar 37 and the locking nut 36. In the locking position, therefore, the locking collar 37 is received in the locking seat 50. As stated above, in such locking position, additionally the upper locking ring portion 22 and the lower locking ring portion 24 essentially come together to form the complete locking ring 16.

The clamp 10 may further include a second gripping portion 31. As depicted in the figures, the second gripping portion 31 may be provided in the form of a rectangular grab bar 51 formed contiguously with a plate 53. The second gripping portion 31 may be pivotally connected to the lower clamp portion 14 by a lower hinge 52 provided at an end of the plate 53 opposite the grab bar 51. The grab bar 51 may be secured to a positioning block 54 with nuts 56. FIGS. 3 and 4, for example, depict an exemplary orientation in which the torque tool 28 has been pivoted to an upright position relative to the upper and lower clamp portions, and the grab bar is pivoted to a position with the plate 53 being essentially at a right angle to the torque tool shaft 32. In such an orientation, the positioning block 54 rests in a recess formed by a first foot 58 and a second foot 60 that holds the lower hinge 52.

A rectangular grab bar particularly is suited for use by either a human user or a robotic ROV. As described above, particularly in undersea oceanic applications such as deep water oil and gas drilling systems, a robotic ROV is required to place clamps in hydraulic systems. Such ROVs typically have multiple robotic arms. In connection with the described clamp, a robotic arm may grip the grab bar 51 and be remotely operated to position the clamp in the proper position. Positioning may also be aided by utilizing a second robotic arm to grip the T-bar of the torque tool 28. Once the clamp is properly positioned, a robotic arm may turn the T-bar to lock the clamp in the manner described above.

Figure 6:
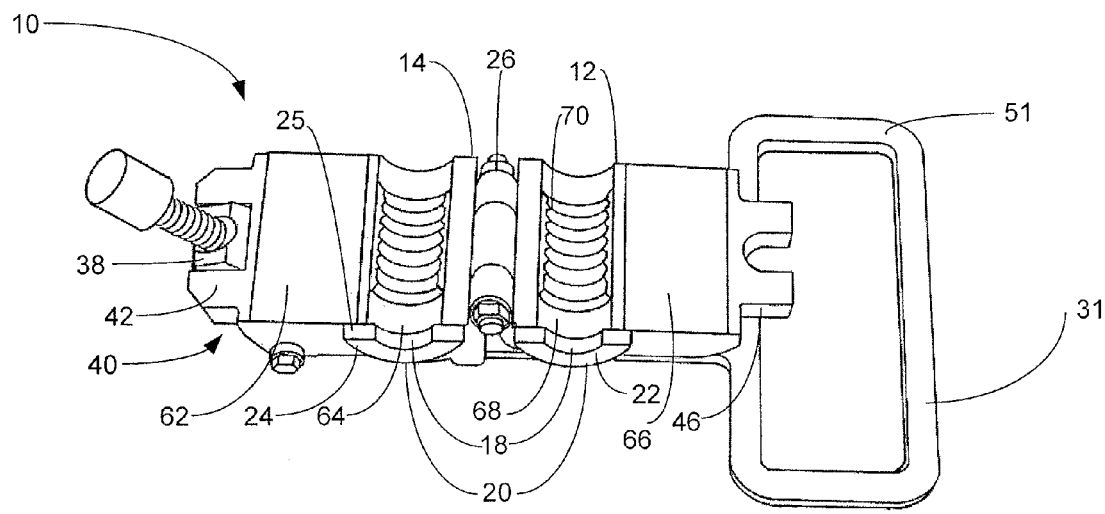
FIG. 6 is a schematic diagram depicting the clamp of FIGS. 1-5 in a fully open position.

As also stated above, the locking ring 16 provides part of the locking mechanism for securing a clamped hose/connection nipple assembly in place when the clamp is in a fully closed (or nearly fully closed) locking position. FIG. 6 is a schematic diagram depicting the clamp 10 in essentially a fully open position to expose the inner surfaces of the upper and lower clamp portions 12 and 14. As is seen in the various figures, in the locking position the upper and lower clamp portions define a substantially cylindrical recess. The cylindrical recess may receive a hose/connection nipple assembly as described in more detail below.

In the open position depicted in FIG. 6, each of the upper and lower clamp portions defines a semi-cylindrical portion of the overall recess formed when the clamp is closed. Referring to the lower clamp portion 14, the lower arms 42 may be contiguous with a first flat surface 62, which in turn is attached to a lower clamping surface 64 that defines the bottom portion of the recess formed when the clamp is closed. Similarly, the upper arms 46 may be contiguous with a second flat surface 66, which in turn is attached to an upper clamping surface 68 that defines the upper portion of the recess formed when the clamp is closed. At least one, and in an exemplary embodiment both, of the clamping surfaces 64 and 68 may be provided with a plurality of clamping teeth 70 that extend into the recess defined by the upper and lower clamp portions. FIG. 6 also depicts the clamping hinge 26 that pivotally connects the upper and lower clamp portions.

FIG. 6 further depicts the locking ring 16 including the upper locking ring portion 22 attached to the upper clamp portion 12, and the lower locking ring portion 24 attached to the lower clamp portion 14. The locking ring portions each include lateral faces 25 that are essentially parallel to the first and second flat surfaces 62 and 66. The respective lateral faces 25 of the locking ring portions are configured essentially oppositely to each other, and when the upper and lower clamp portions are in the second locking position, the opposite lateral faces of the locking ring portions are positioned opposite each other.

Figure 7:
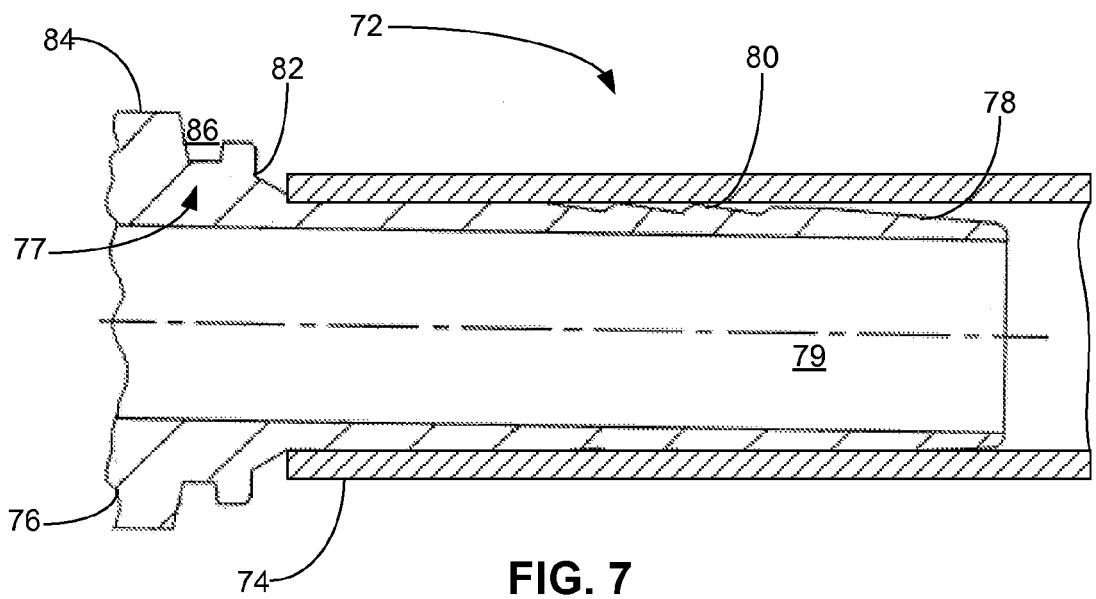
FIG. 7 is a schematic diagram depicting a side cross-sectional view of an exemplary hose/connection nipple assembly.

FIG. 7 is a schematic diagram depicting a side cross-sectional view of an exemplary hose/connection nipple assembly 72. The hose/connection nipple assembly 72 includes a hose 74 and a connection nipple 76 partially inserted into the hose. The connection nipple 76 includes a first end having tapered portion 78 that may be easily inserted into the hose opening. The connection nipple and hose may then be pushed relative to each other to force the connection nipple further into the hose. The connection nipple has an inner channel 79 for the passage of hydraulic fluid from a hydraulic fluid source into the hose (or sometimes between two hoses). The connection nipple may also include a plurality of gripping ridges 80 that aid in securing the connection nipple within the hose, and a stopper ridge 82 that limits the amount by which the connection nipple may be inserted into the hose. In FIG. 7, the connection nipple has been inserted into the hose essentially by the maximum amount.

The connection nipple 76 has a locking mechanism 77 that includes the stopper ridge 82 and a raised surface 84. The stopper ridge 82 and raised surface 84 define a locking slot 86 that extends circumferentially around the connection nipple. The locking ring 16 of the clamp 10 is configured to be received in the locking slot 86 when the upper and lower clamp portions are in the second locking position.

Figure 8:
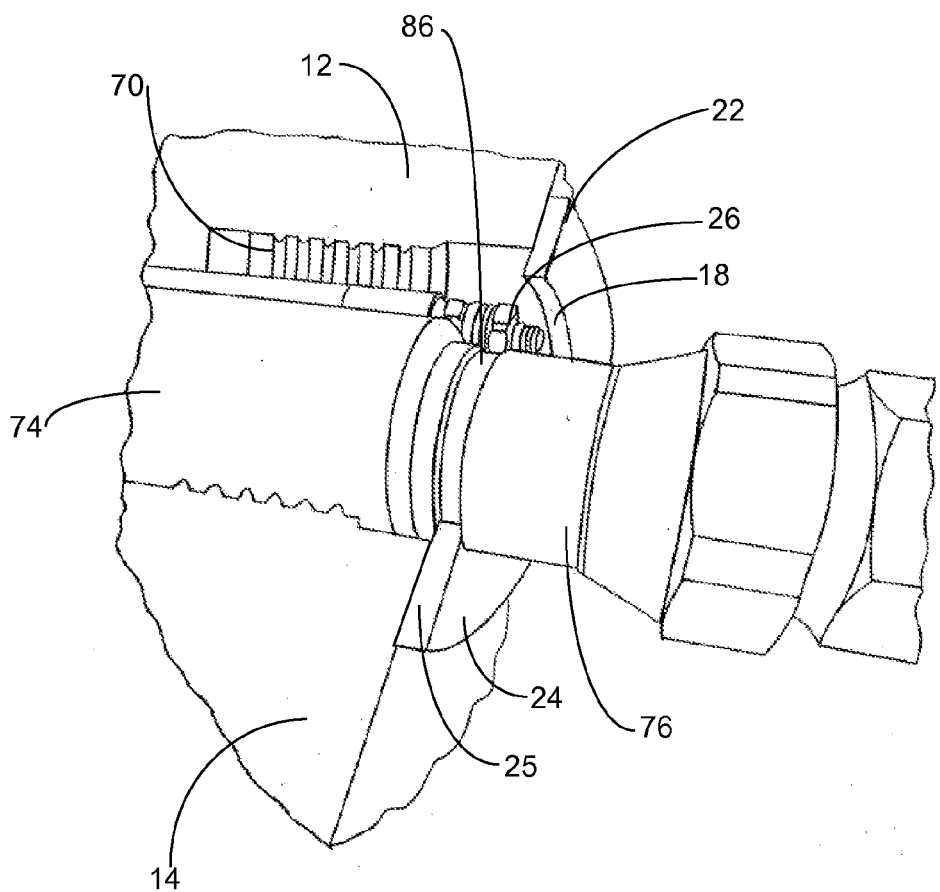
FIG. 8 is a schematic diagram depicting an exemplary positioning of the hose/connection nipple assembly within a hose intervention clamp.

In particular, FIG. 8 is a schematic diagram depicting an exemplary positioning of the hose/connection nipple assembly 72 within the clamp 10, the clamp 10 being in the fully open position. In this example, the connection nipple 76 has been inserted into the hose 74, and the resultant assembly is resting in the lower clamp portion 14. As seen in FIG. 8, a part of the lower locking ring portion 24 adjacent the inner radial surface 18 is received in the slot 86 formed in the connection nipple. To close and lock the clamp, the upper clamp portion 12 may be pivoted about the clamp hinge 26. When in the locking position, a part of the upper locking ring portion 22 adjacent its inner radial surface will be received in the slot 86 formed in the connection nipple. The locking ring is configured to be received in the locking slot to lock the connection nipple in the clamp insofar as the inner radial surface 18 of the locking ring has a diameter that is smaller than a diameter of the cylindrical recess formed by the upper and lower clamp portions in the locking position.

In FIG. 8, the clamp is depicted in the fully open position for illustrative purposes, but the clamp may be only partially opened to position the clamp, as seen for example in FIGS. 1 and 3. To utilize the clamp in difficult environmental conditions, for example, the clamp may be assembled remotely from the intervention location to include the grab bar and torque tool. Initially, however, the torque tool would be tightened only as far as would maintain the first partially open configuration as depicted in FIGS. 1 and 3. A robotic ROV may then transport the clamp to the intervention or connection location. Robotic arms may be used to insert a connection nipple into an exposed hose, and then the partially opened clamp may be slid over the formed hose/connection nipple assembly. The locking ring may be utilized to properly position the clamp, such as, for example, manipulating the clamp until the lower locking ring portion is positioned within the locking slot of the connection nipple similarly as to the depiction in FIG. 8. The ROV may then turn the torque tool to close the clamp from the first partially open position to the second locking position about the hose/connection nipple assembly as described above.

Figure 9:
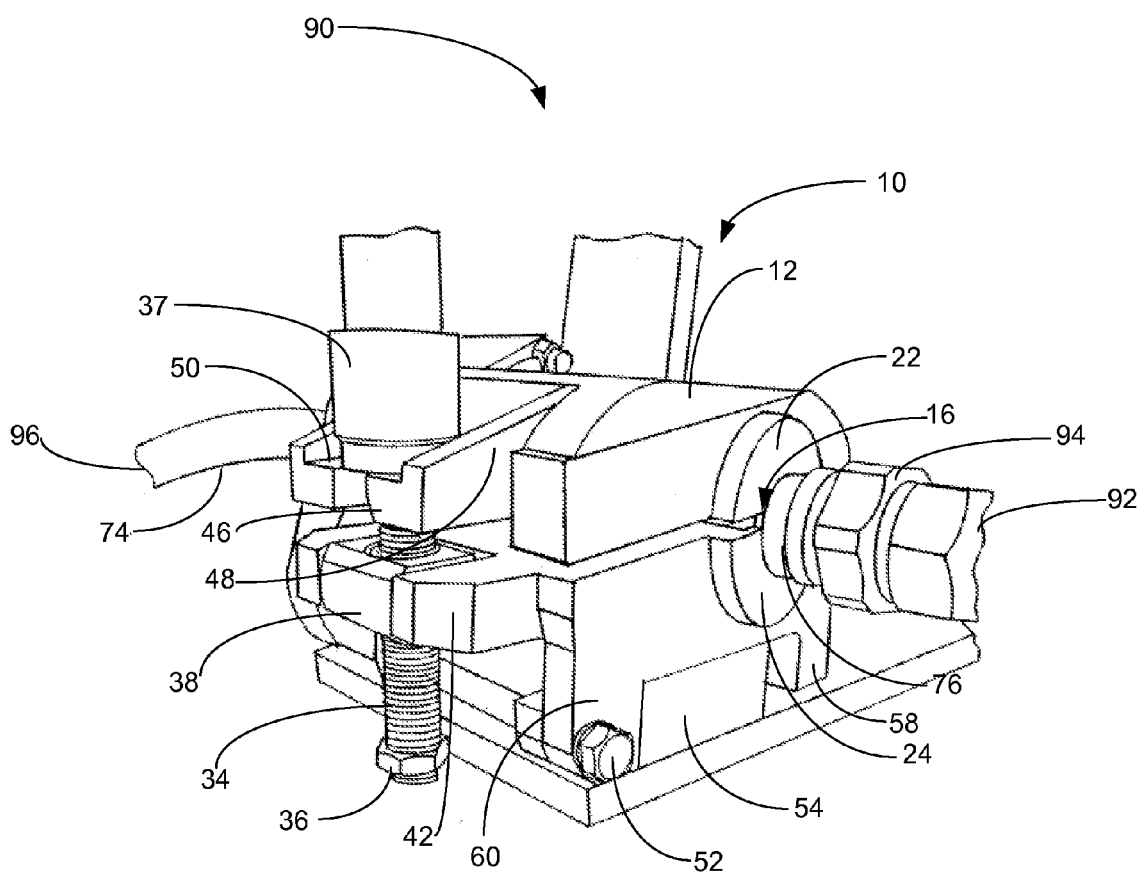
FIG. 9 is a schematic diagram depicting a three-dimensional perspective view of an exemplary assembled hose intervention clamp system in accordance with embodiments of the present invention.

FIG. 9 is a schematic diagram depicting an exemplary assembled hose intervention clamp system 90. The system includes the hose 74, the connection nipple 76, and the locked clamp 10. Many additional features described above also are identified in FIG. 9. As further seen in FIG. 9 (and FIG. 8), the connection nipple 76 and resultant system 90 may include a second or connection end 92 that is opposite to the first tapered end 78 of the connection nipple. The second end 92 may include a connector 94 for connection to a hydraulic fluid source. The system 90 also may include a conveyance end 96, at which the hose exits the clamp 10 for conveying hydraulic fluid to the remainder of a hydraulic circuit.

The described system has advantages over conventional hose intervention clamp systems. The locking ring provides for enhanced positioning and securing of a joint at which a hose and connection nipple are connected. The locking ring of the clamp is configured to be received in the locking slot of the connection nipple to ensure proper positioning of the hose/connection nipple assembly within the clamp. Once the clamp is closed to the locking position, the configuration by which part of the locking ring is received in the locking slot provides enhanced protection against axial forces, thereby substantially reducing the propensity of the connection nipple to pull away from the hose as commonly may occur in conventional systems. This enhancement of the described system is particularly acute in hostile environments, such as undersea oceanic environments.

In addition, the closed clamp in the locking position maintains the joint as against radial forces as well, thereby permitting the pressurized fluid to flow with a minimal likelihood of rupture or leakage of hydraulic fluid. In this regard, as stated above conventional hoses are made of a resilient material formed or extruded over a wire-like or metal mesh. This provides a balance between a desire for some resiliency to aid in hose manipulation, while having sufficient stiffness to reduce a likelihood of rupture. When the clamp is locked, the clamping teeth 70 that extend into the recess defined by the clamping portions are driven into and penetrate an outer portion of the hose material, which further aids in securing the joint against the axial and radial forces generated by the flowing pressurized hydraulic fluid.

The described system also is well-suited for intervention in environments that are typically accessible only by robotic ROVs. The first and second gripping portions, provided for example in the form of the T-bar of the torque tool 28 and grab bar 51, may be manipulated readily by the robotic arms of such ROVs to both position and tighten the clamp with respect to an associated hose/connection nipple assembly. The dual-gripping configuration, therefore, results in enhanced system performance as compared to conventional configurations.

Figure 10:
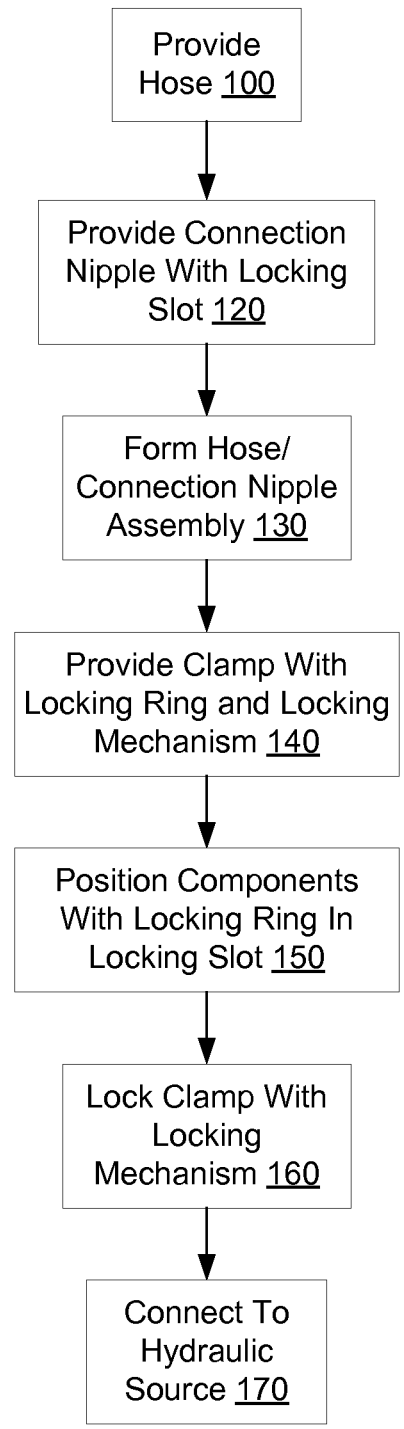
FIG. 10 is a flow chart depicting an exemplary method of performing a hose intervention repair of a hydraulic system in accordance with embodiments of the present invention.

In accordance with the above, FIG. 10 is a flow chart depicting an exemplary method of performing a hose intervention repair in a hydraulic system. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

Step 100 may be to provide a hose, and step 120 may be to provide a connection nipple having a first tapered end and a locking slot. At step 130, a hose/connection nipple assembly may be formed by inserting the tapered end of the connection nipple into the hose. Step 140 may be to provide a clamp having a locking ring and a locking mechanism (e.g., torque tool). Step 150 may be to position the clamp relative to the hose/connection nipple assembly such that the locking ring is positioned in the locking slot. Step 160 may be to lock the clamp by operating the locking mechanism to lock the clamp over the hose/connection nipple assembly. At step 170, the connection nipple may be connected at a second end to a hydraulic fluid source.

Figure 11:
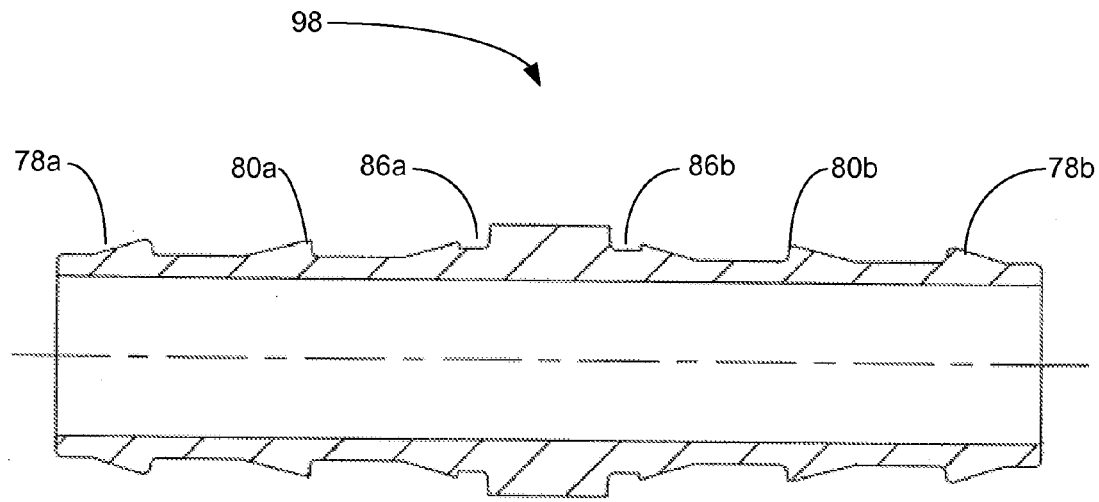
FIG. 11 is a schematic diagram depicting a cross-sectional view of an exemplary connection nipple for joining two hose sections.

Referring again to FIG. 9, in such embodiment one end of the connection nipple is provided with a connector 94 for connection to a hydraulic fluid source. Under certain circumstances, however, a connection nipple configuration is desirable for joining two hose sections together rather than connecting a hose to a hydraulic source. FIG. 11, therefore, is a schematic diagram depicting a cross-sectional view of an exemplary connection nipple 98 for joining two hose sections. In many respects, the connection nipple 98 is similar to the connection nipple of FIG. 7, except the connection nipple 98 is provided with comparable features on both sides for insertion into a hose. For example, the connection nipple may have a first tapered portion 78*a* and a second tapered portion 78*b*, each of which may be inserted into a hose. The connection nipple 98 also may include two sets of gripping ridges 80*a* and 80*b*, and a first locking slot 86*a* and a second locking slot 86*b*.

A first clamp 10 may be provided in which the locking ring 16 of the first clamp is configured to be received in the first locking slot 86*a* when the upper and lower clamp portions of the first clamp are in the second locking position. In addition, a second clamp 10 may be provided in which the locking ring 16 of the second clamp is configured to be received in the second locking slot 86*b* when the upper and lower clamp portions of the second clamp are in the second locking position. With such a configuration, two hose sections may be joined in a manner comparably to the manner of joining a hose section to a hydraulic fluid source as described above.

Figure 12:
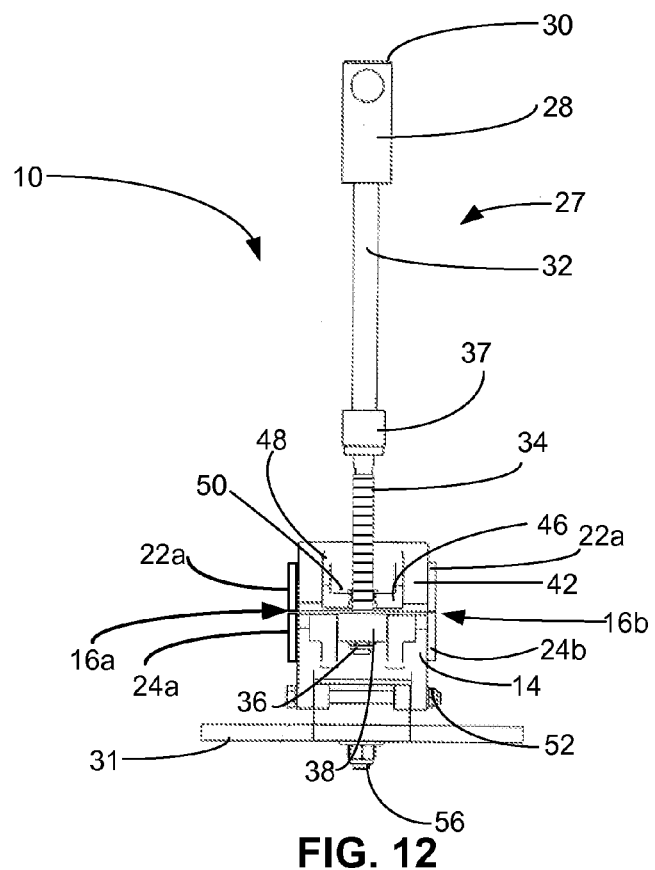
FIG. 12 is a schematic diagram depicting a front view of a second exemplary hose intervention clamp in accordance with embodiments of the present invention.

Alternatively, a single locking clamp 10 may have a first locking ring and a second locking ring on a side of the clamp opposite to the first locking ring, rather than having only a single locking ring as in previous embodiments. For example, FIG. 12 is a schematic diagram depicting a front view of an exemplary intervention clamp similar to FIG. 5, which has a first locking ring 16*a* and a second locking ring 16*b* on opposite sides of the clamp. Each locking ring 16a and 16b respective has an upper locking ring portion 22a or 22b, and a lower locking ring portion 24a or 24b. Both the first and second locking rings are configured to be received respectively in the first and second locking slots 86a and 86b of the connection nipple of FIG. 11 when the upper and lower clamp portions of the clamp are in the locking position. With such a configuration as well, two hose sections may be joined in a manner comparably to the manner of joining a hose section to a hydraulic fluid source as described above.

Figure 13:
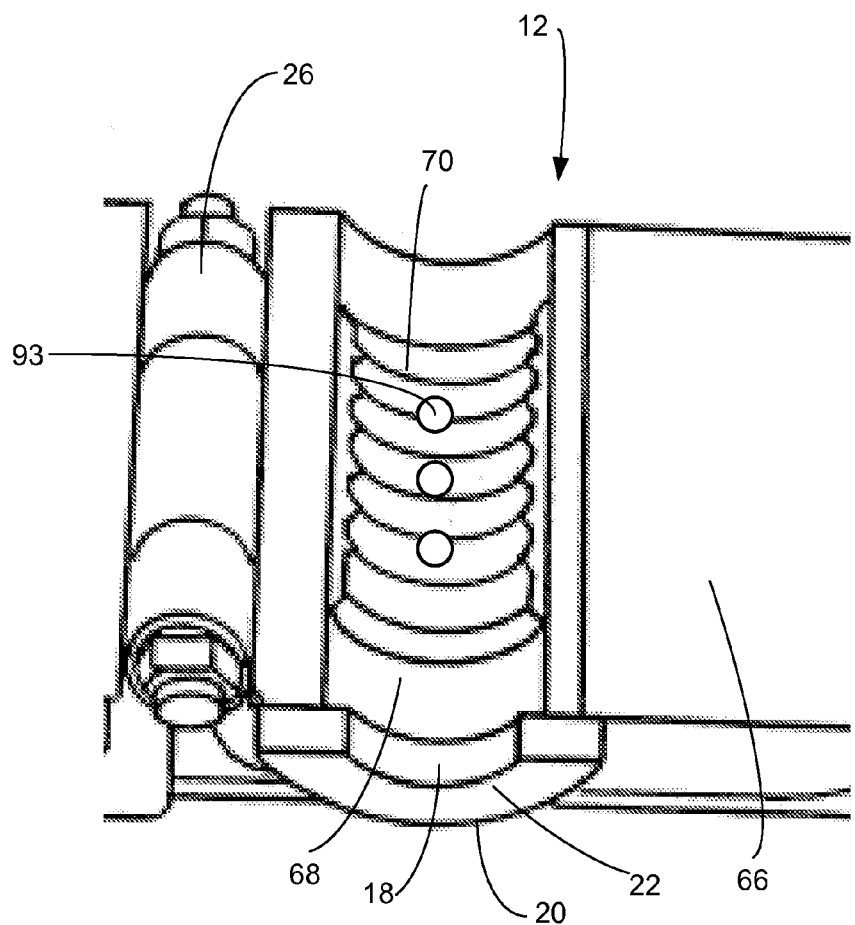
FIG. 13 is a schematic diagram depicting an exemplary embodiment of a portion of a clamp, including bore holes.
Figure 14:
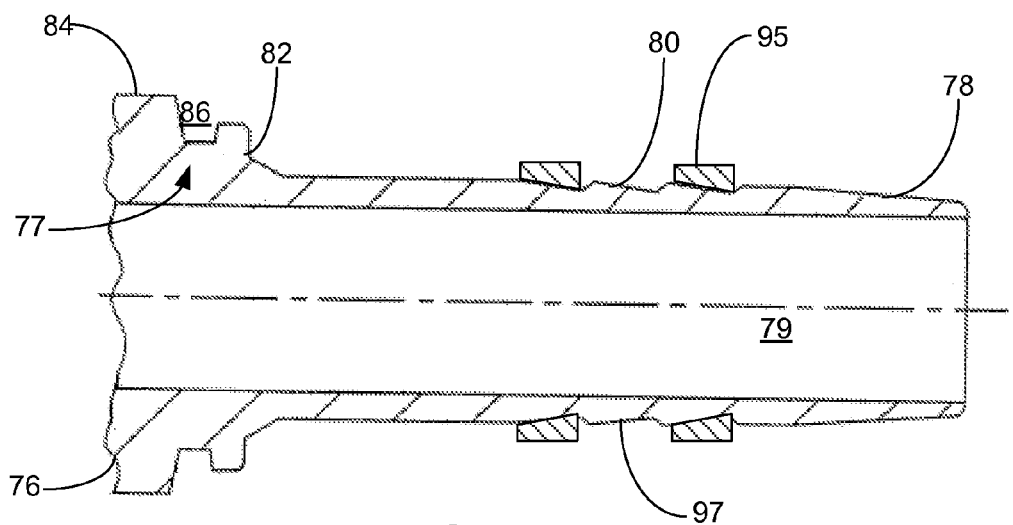
FIG. 14 is a schematic diagram depicting a cross-sectional view of an exemplary embodiment of a connection nipple including at least one sealing element.

FIGS. 13 and 14 pertain to an additional embodiment particularly suited for deep water drilling and similar deep water operations. In such environments, water may become entrapped in the grooves among the teeth of the clamp, and in any spaces between the gripping ridges of the connection nipple and the hose. Entrapped water may undermine the efficacy of the hose intervention clamp system. In addition, entrapped water particularly between the connection nipple and the hose can result in leakage of the hydraulic fluid. To address such issues, the hose intervention clamp system of the present invention may be provided with "hydro-lock" features that substantially reduce the propensity for the entrapment of water.

In view of such issues, FIG. 13 depicts a portion of the clamp 10 of FIG. 6 including the upper clamp portion 12 having the upper clamping surface 68. Because the clamp 10 is formed in two halves, water tends to be evacuated from between the clamp portions as the clamp is closed. To aid in the removal of water, the clamp 10 of FIG. 13 may be provided with at least one bore hole 93 that penetrates through the upper clamp portion 12 beginning at the upper clamping surface 68. As the clamp portions are closed together to the second clamping position, water can evacuate from the region of the hose/connection nipple assembly through the bore holes. In the example of FIG. 13, three bore holes are shown that would penetrate through the upper clamp portion 12 beginning at the upper clamping surface 68. It will be appreciated that other bore hole configurations may be employed. For example, a different number of bore holes may be employed, and/or the bore holes may be provided in a different portion of the clamp, such as through the lower clamp portion 14 beginning at the lower clamping surface 64.

FIG. 14 depicts the cross-sectional view of the connection nipple 76 of FIG. 7 modified so as to include hydro-lock features. In particular, the connection nipple 76 includes at least one sealing element 95 that extends from an outer surface 97 of the connection nipple. The example of FIG. 14 depicts two such sealing elements, although additional sealing elements may be employed. The sealing elements 95 may be formed as raised ridges that extend to at least a height of the gripping ridges 80. In this manner, when the connection nipple is inserted and pushed into the hose, fluid is essentially blocked from flowing from the hose over the tapered end 78 to the spaces that may be formed between the hose and the gripping ridges 80. The potential for fluid leakage, therefore, is substantially reduced. The at least one sealing element 95 may be an O-ring, or a chevron or lip seal to create a dynamic seal. Generally, any suitable sealing structure may be employed.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A hose intervention clamp for clamping a hose/connection nipple assembly, wherein the hose/connection nipple assembly has a hose and a connection nipple having a locking slot, the clamp comprising:
   a locking ring;
   an upper clamp portion; and
   a lower clamp portion pivotally connected to the upper clamp portion;
   wherein the upper and lower clamp portions are pivotally moveable relative to each other from a first at least partially open position to a second locking position, and in the second locking position the upper and lower clamp portions define a recess for receiving the hose/connection nipple assembly, and
   the locking ring is configured to be received in the locking slot when the upper and lower clamp portions are in the second locking position; and
   wherein:
   the locking ring comprises an upper locking ring portion attached to the upper clamp portion and a lower locking ring portion attached to the lower clamp portion, and each locking ring portion includes a lateral face;
   the upper clamp portion includes a first flat surface parallel and adjacent to the lateral surface of upper locking ring portion;
   the lower clamp portion includes a second flat surface parallel and adjacent to the lateral surface of the lower locking ring portion; and
   when the upper and lower clamp portions are in the second locking position, the lateral faces of the locking ring portions are positioned adjacent and opposite each other, and the flat surfaces of the upper and lower clamp portions are positioned adjacent and opposite each other; and
   further comprising a locking mechanism for moving the upper and lower clamp portions from the first partially open position to the second locking position,
   wherein locking mechanism comprises a torque tool having a first gripping portion that is operable to move the upper and lower clamp portions from the first partially open position to the second locking position, the torque tool has a locking collar, and the upper clamp portion has a locking seat, and when the upper and lower clamp portions are in the second locking position, the locking collar is received in the locking seat.

2. The clamp of claim 1, wherein the recess is a cylindrical recess, and the locking ring has an inner radial surface that has a diameter smaller than a diameter of the cylindrical recess.

3. The clamp of claim 1, wherein at least one of the upper and lower clamp portions has a plurality of clamping teeth that extend into the recess, and when the upper and lower clamp portions are in the second locking position, the clamping teeth penetrate an outer portion of the hose.

4. The clamp of claim 1, wherein the torque tool has a swivel nut for pivotally connecting the torque tool to the lower clamp portion.

5. The clamp of claim 1, further comprising at least one bore hole that penetrates through either the upper clamp portion or the lower clamp portion.

6. A hose intervention clamp for clamping a hose/connection nipple assembly, wherein the hose/connection nipple assembly has a hose and a connection nipple having a locking slot, the clamp comprising:
   a locking ring;
   an upper clamp portion; and a lower clamp portion pivotally connected to the upper clamp portion;

wherein the upper and lower clamp portions are pivotally moveable relative to each other from a first at least partially open position to a second locking position, and in the second locking position the upper and lower clamp portions define a recess for receiving the hose/connection nipple assembly, and the locking ring is configured to be received in the locking slot when the upper and lower clamp portions are in the second locking position; and wherein:

the locking ring comprises an upper locking ring portion attached to the upper clamp portion and a lower locking ring portion attached to the lower clamp portion, and each locking ring portion includes a lateral face;

the upper clamp portion includes a first flat surface parallel and adjacent to the lateral surface of upper locking ring portion;

the lower clamp portion includes a second flat surface parallel and adjacent to the lateral surface of the lower locking ring portion; and when the upper and lower clamp portions are in the second locking position, the lateral faces of the locking ring portions are positioned adjacent and opposite each other, and the flat surfaces of the upper and lower clamp portions are positioned adjacent and opposite each other; and further comprising a gripping portion including a grab bar attached to a plate.

7. The clamp of claim 6, wherein the gripping portion is pivotally connected at the plate to the lower clamp portion.

8. A hose intervention clamp system comprising:

a hose/connection nipple assembly including a hose, and a connection nipple having a locking slot; and a hose intervention clamp for clamping the hose/connection nipple assembly, the clamp comprising:

a locking ring;

an upper clamp portion; and a lower clamp portion pivotally connected to the upper clamp portion;

wherein the upper and lower clamp portions are pivotally moveable relative to each other from a first at least partially open position to a second locking position, and in the second locking position the upper and lower clamp portions define a recess for receiving the hose/connection nipple assembly, and the locking ring is configured to be received in the locking slot when the upper and lower clamp portions are in the second locking position; and wherein:

the locking ring comprises an upper locking ring portion attached to the upper clamp portion and a lower locking ring portion attached to the lower clamp portion, and each locking ring portion includes a lateral face;

the upper clamp portion includes a first flat surface parallel and adjacent to the lateral surface of upper locking ring portion;

the lower clamp portion includes a second flat surface parallel and adjacent to the lateral surface of the lower locking ring portion; and when the upper and lower clamp portions are in the second locking position, the lateral faces of the locking ring portions are positioned adjacent and opposite each other, and the flat surfaces of the upper and lower clamp portions are positioned adjacent and opposite each other.

9. The hose intervention clamp system of claim 8, wherein the connection nipple comprises a stopper ridge and a raised surface that define the locking slot.

10. The hose intervention clamp system of claim 8, wherein the connection nipple has a connector for connecting the connection nipple to a hydraulic fluid source.

11. The hose intervention clamp system of claim 8, wherein the connection nipple has at least one sealing element that extends from an outer surface of the connection nipple.

12. A hose intervention clamp system comprising:

a first hose section and a second hose section;

a connection nipple comprising:

a first tapered end that is inserted into the first hose section;

a second tapered end that is inserted into the second hose section; and a first locking slot and a second locking slot; and first and second hose intervention clamps respectively for clamping the first and second hose sections to the connection nipple, the first and second clamps each comprising:

a locking ring;

an upper clamp portion; and a lower clamp portion pivotally connected to the upper clamp portion;

wherein the upper and lower clamp portions are pivotally moveable relative to each other from a first at least partially open position to a second locking position, and in the second locking position the upper and lower clamp portions define a recess for receiving a respective one of the first or second hose sections and the connection nipple, and wherein:

the locking ring comprises an upper locking ring portion attached to the upper clamp portion and a lower locking ring portion attached to the lower clamp portion, and each locking ring portion includes a lateral face;

the upper clamp portion includes a first flat surface parallel and adjacent to the lateral surface of upper locking ring portion;

the lower clamp portion includes a second flat surface parallel and adjacent to the lateral surface of the lower locking ring portion; and when the upper and lower clamp portions are in the second locking position, the lateral faces of the locking ring portions are positioned adjacent and opposite each other, and the flat surfaces of the upper and lower clamp portions are positioned adjacent and opposite each other;

wherein the locking ring of the first clamp is configured to be received in the first locking slot when the upper and lower clamp portions of the first clamp are in the second locking position; and wherein the locking ring of the second clamp is configured to be received in the second locking slot when the upper and lower clamp portions of the second clamp are in the second locking position.

13. A hose intervention clamp system comprising:

a first hose section and a second hose section;

a connection nipple comprising:

a first tapered end that is inserted into the first hose section;

a second tapered end that is inserted into the second hose section; and a first locking slot and a second locking slot; and a hose intervention clamp for clamping the first and second hose sections to the connection nipple, the clamp comprising:
first and second locking rings on opposite sides of the clamp;
an upper clamp portion; and
a lower clamp portion pivotally connected to the upper clamp portion;
wherein the upper and lower clamp portions are pivotally moveable relative to each other from a first at least partially open position to a second locking position, and in the second locking position the upper and lower clamp portions define a recess for receiving the first and second hose sections and the connection nipple, and
wherein:
the locking rings each comprises an upper locking ring portion attached to the upper clamp portion and a lower locking ring portion attached to the lower clamp portion, and each locking ring portion includes a lateral face;
the upper clamp portion includes a first flat surface parallel and adjacent to the lateral surface of upper locking ring portions;
the lower clamp portion includes a second flat surface parallel and adjacent to the lateral surface of the lower locking ring portions; and
when the upper and lower clamp portions are in the second locking position, the lateral faces of the locking ring portions are positioned adjacent and opposite each other, and the flat surfaces of the upper and lower clamp portions are positioned adjacent and opposite each other wherein the first locking ring is configured to be received in the first locking slot when the upper and lower clamp portions of the clamp are in the second locking position; and
the second the locking ring is configured to be received in the second locking slot when the upper and lower clamp portions of the clamp are in the second locking position.

14. A hose intervention clamp for clamping a hose/connection nipple assembly, wherein the hose/connection nipple assembly has a hose and a connection nipple having a locking slot, the clamp comprising:
a locking ring;
an upper clamp portion;
a lower clamp portion pivotally connected to the upper clamp portion; and
a gripping portion comprising a grab bar attached to a plate wherein:
the upper and lower clamp portions are pivotally moveable relative to each other from a first at least partially open position to a second locking position, and in the second locking position the upper and lower clamp portions define a recess for receiving the hose/connection nipple assembly, and
the locking ring is configured to be received in the locking slot when the upper and lower clamp portions are in the second locking position.

15. The clamp of claim 14, wherein the gripping portion is pivotally connected at the plate to the lower clamp portion.

* * * * *